United States Patent Office 3,775,473
Patented Nov. 27, 1973

3,775,473
METHOD FOR THE OXIDATION OF ARYL METHYL GROUPS TO CARBOXYLIC ACID GROUPS
Norbert J. Mruk, Plum Boro, Pa., assignor to Koppers Company, Inc.
No Drawing. Filed Dec. 29, 1971, Ser. No. 213,720
Int. Cl. C07c 63/06
U.S. Cl. 260—524 M                            6 Claims

ABSTRACT OF THE DISCLOSURE

A method in which oxidation resistant aryl methyl groups can be oxidized to a carboxylic acid group involving the steps of mixing sulfuric acid, vanadium pentoxide or manganese dioxide with a methyl substituted benzene. Heating the mixture to a temperature not greater than about 150° C. and simultaneously agitating the mixture until the aryl methyl group has oxidized to a carboxylic acid group and separating the acid thus formed.

FIELD OF THE INVENTION

The present invention relates to a method for the preparation of aryl carboxylic and aryl dicarboxylic acids by the oxidation of aryl methyl groups. In particular, the invention is addressed to the oxidation of aryl methyl groups which are difficult to oxidize to their corresponding carboxylic acid.

BACKGROUND OF THE INVENTION

The commercial preparation of aryl carboxylic acids have been largely through the oxidation of the corresponding alkylbenzenes. Isophthalic acid, for example, has been prepared by the oxidation of m-xylene with dilute nitric acid or by the liquid-phase air catalytic oxidation with a bromine promoted heavy metal. Terephthalic acid has been similarly prepared by the oxidation of p-xylene with nitric acid.

A number of improvements have refined the nitric acid process so that quantitive amounts of terephthalic acid can be economically produced. There exists, however, a number of disadvantages associated with this process including the need for an auxiliary nitric acid plant to utilize the lower oxides of nitrogen produced in the oxidation reaction; the high temperatures and concentrations of nitric acid required for the quantitative production of the acids makes the process susceptible to explosion; and the nitrogen impurities found to exist are difficult to remove, thereby lowering the purity of the acid.

Other processes have been developed utilizing oxygen oxidation under pressure and a glacial acetic acid solvent with cobalt or manganese salt catalysts. Activators such as sodium bromide or other bromine source or methyl ethyl ketone are required. Toluic acid intermediates are produced which are then oxidized to the corresponding phthalic acid. These processes do not have the attendant disadvantages found in the nitric acid processes, and appear to give quantative amounts of the corresponding carboxylic acid, for example 30 to 95% of the alkylbenzene is oxidized to the corresponding acid.

While the production of phthalic acids from the toluic acid intermediate is accomplished by the latter processes, oxidation of other alkylbenzenes, such as of dinitrotoluene are not easily accomplished, if at all. The nitric acid processes, on the other hand, are capable of oxidizing dinitrotoluene to dinitrobenzoic acid, but have the disadvantages set out above.

The present invention provides a method for producing a number of aryl carboxylic acids from the corresponding alkyl-benzene without the disadvantages associated with the nitric acid processes. Moreover, the present invention provides a method for preparing aryl carboxylic acids and aryl dicarboxylic acids by the oxidation of aryl methyl groups that are largely oxidation resistant or otherwise difficult to oxidize under safe conditions.

SUMMARY OF THE INVENTION

The present invention comprises the liquid phase oxidation of aryl methyl groups to their corresponding carboxylic or dicarboxylic acid groups. The oxidation takes place in the presence of sulfuric acid and an oxidation reagent. The oxidation reagent is manganese dioxide or preferably, vanadium pentoxide. The reaction time as well as the reaction temperature vary according to the particular alkylbenzenes undergoing oxidation. While neither pressure nor oxygen is required for the present invention, the process may be carried out in the presence of both.

In carrying out the process in accordance with the present invention the times and temperatures vary according to the particular functional groups attached to the benzene molecule. For example, p-toluic acid is more quickly oxidized to terephthalic acid than dinitrotoluene, which requires a longer reaction time to oxidize to dinitrobenzoic acid. The nitro groups on the benzene molecule deactivate the methyl group, thus making the oxidation much more difficult. Xylene on the other hand, can be more readily oxidized to toluic acid because the methyl groups are electron activating. The carboxyl group in toluic acid, however, is electron withdrawing and deactivates the aryl methyl group so that oxidation to the corresponding phthalic acid is more difficult.

While manganese dioxide is a suitable oxidation reagent in the present invention, vanadium pentoxide is preferred. Vanadium pentoxide produces a greater amount of the corresponding acid. The quantitative yields range up to about 100% based upon the amount of alkylbenzene feedstock. Utilization of manganese dioxide produces a manganese sulfate byproduct which is useful as a fertilizer; vanadium pentoxide on the other hand, may be regenerated for reuse in the process. Regeneration of the vanadium salts can, for example, be accomplished by heating the salts in the presence of oxygen at high pressure or other processes known to those skilled in the art.

To effectuate oxidation of the aryl methyl groups, sulfuric acid is used in a concentration that is substantially the inverse function of the oxidizability of the particular aryl methyl group. For example, with a concentration of 84% 2,4-dinitrotoluene requires a longer oxidation time than p-toluic acid in the same sulfuric acid concentration.

With 2,4-dinitrotoluene, a temperature of about 150° C. was found to provide oxidation yields of from 96 to 100%. Complete oxidation required approximately four hours. In the oxidation of p-toluic acid, however, lower temperatures and less time are required.

The oxidation of the aryl methyl group to a carboxylic acid group requires a six electron change. The vanadium oxidant functions as a two electron oxidant. Accordingly, 3 moles of vanadium pentoxide are required per mole of dinitrotoluene. Since manganese dioxide functions as either a one or a two electron oxidant, 3 to 6 moles of manganese dioxide are required for each mole of dinitrotoluene.

The present invention and its attendant advantages may be clearly understood from a perusal of the following nonlimiting examples.

Example I 56.6 g. of 84% $H_2SO_4$, 3.00 g. (0.0165 moles) of 2,4-dinitrotoluene (DNT), and 3.00 g. (0.0165 moles) of $V_2O_5$ were charged into a 100 ml. glass liner placed into a 300 ml. stainless steel rocking autoclave. The charge was subjected to 300 p.s.i. $O_2$ and heated to 150° C. for 1–2 hours. No oxygen was absorbed.

The reaction mixture was diluted with water, the solids were filtered and washed with more water. A yield of 2.49 g. of solids were analyzed by NMR and VPC and found to have the following analysis:

|  | Percent |
|---|---|
| 2,4-dinitrobenzoic acid (DNBA) | 10–25 |
| 2,4-dinitrotoluene (DNT) | 90–75 |

Example II 37.8 g. of 84% $H_2SO_4$, 2.00 g. (0.0110 moles) 2,4-DNT and 6.60 g. (0.0360 moles) $V_2O_5$ were charged into a 100 ml. glass liner placed into a 300 ml. stainless steel rocking autoclave. The charge was subjected to 300 p.s.i. $O_2$ at room temperature and heated to about 150° C. for four hours. No $O_2$ was absorbed.

The reaction mixture was diluted with water and filtered. The filter cake was washed with water and dried to yield 1.59 g. of 2,4-DNBA M.P. 180–182°. The filtrate was extracted with ether (5× 75 ml.) and the ether extracts combined, dried ($Na_2SO_4$), filtered and evaporated in vacuo to give 0.64 g. of 2,4-DNBA M.P. 178–180°.

Total yield of 2,4-DNBA was 96%.

Example III

Example III was performed under the same conditions as Example II and a total yield of 2,4-DNBA of 100% was obtained.

Example IV 37.8 g. of 84% $H_2SO_4$, 2.00 g. (0.0110 moles) of 2,4-dinitrotoluene and 6.60 g. (0.0363 moles) $V_2O_5$ were charged into a 100 ml. three neck round bottom flask having a mechanical stirrer, thermometer and a condenser. The reaction mixture was stirred and heated at 150° C. for four hours. The reaction mixture was diluted with water and the product was separated as set forth in Examples II and III to give 2,4-DNBA in 90–100% yield.

Examples V and VI

Examples V and VI were performed under similar conditions as Examples II and III except that 10% $H_2SO_4$ and 50% $H_2SO_4$ were used respectively. Examples V and VI recovered 82% and 74% dinitrotoluene, respectively. Thus, quantitative yields of 2,4-DNBA were not obtainable with a weak $H_2SO_4$.

Example VII 37.8 g. of 84% $H_2SO_4$, 2.00 g. (0.0110 moles) 2,4-DNT and 2.10 g. (0.0242 moles) $MnO_2$ were charged into a 100 ml. glass liner placed into a 300 ml. stainless steel rocking autoclave. The charge was subjected to 300 p.s.i. $O_2$ at room temperature and heated to 150° C. for four hours. No $O_2$ was absorbed.

The reaction mixture was diluted with water and filtered. The filter cake was washed with water, dried and extracted with acetone and the acetone filtrate was evaporated in vacuo to yield 1.12 g. of impure 2,4-DNT. The aqueous acidic filtrate was extracted with ether to yield 0.50 g. of solid, 2,4-DNBA (21% yield).

Example VIII

This example was carried out under similar conditions to Example VII above, except that 6.31 g. (0.0726 moles) of $MnO_2$ were utilized. After heating to 150° C., the reaction exothermed to 240° C. within seven minutes. The mixture was permitted to cool to 150° C. and held for about four hours. The extractions with acetone and ether yielded a 41% total yield of 2,4-DNBA.

Example IX 37.8 g. of 84% $H_2SO_4$ and 6.00 g. (0.0330 moles) of $V_2O_5$ were charged into a three neck, round bottom flash fitted with a mechanical stirrer, thermometer and condenser. 1.50 g. (0.0110 moles) p-toluic acid was added. Shortly after the addition of toluic acid the reaction mixture rapidly exothermed. During the exotherm, the temperature was maintained below 88° C. which thereafter was followed by heating at 100° C. for one hour.

The reaction mixture was diluted with 50 ml. of water and filtered. The resulting solid was washed with water and dried yielding 1.52 g. (83% yield) terephthalic acid, M.P. >350° C.

Example X 100 g. of 50% $H_2SO_4$, 2.02 g. (0.0220 moles) of toluene, and 13.20 g. (0.0725 moles) $V_2O_5$ were charged into a 100 ml. three neck flask having a mechanical stirrer, thermometer and condenser. The reaction mixture was stirred and heated to reflux (100–113° C.) for about six hours.

The reaction mixture was diluted with 50 ml. of water and filtered. The resulting solid was washed with water, dried, and extracted with 50 ml. of acetone. Evaporation of the acetone filtrate yielded 0.34 g. of benzoic acid, M.P. 110–115° C. The aqueous acidic filtrate from the reaction mixture was extracted with ether (5× 75 ml.), the ether extracts were combined, dried ($Na_2SO_4$) and evaporated to give 0.25 g. of benzoic acid, M.P. 100–110° C. Total yield of benzoic acid was 0.59 g. (22%).

While presently preferred embodiments of the invention have been described, it may otherwise be embodied within the scope of the appended claims.

What is claimed is:

1. A method for the oxidation of aryl methyl groups to aryl carboxylic acid groups comprising:
   (A) preparing a reaction mixture of sulfuric acid, vanadium pentoxide, and a methyl substituted benzene;
   (B) agitating and heating said reaction mixture to a temperature not greater than about 150° C. until said methyl groups have oxidized; and
   (C) separating the aryl carboxylic acid from the reaction mixture.

2. The method set forth in claim 1 wherein the methyl substituted benzene is selected from the group consisting of toluene, xylene, p-toluic acid, and dinitrotoluene.

3. A method as set forth in claim 2 wherein the oxidant is added to the reaction mixture in an amount of about 3 moles to 1 mole of methyl substituted benzene.

4. A method as set forth in claim 1 wherein the vanadium pentoxide is regenerated for reuse in step A.

5. A method for the oxidation of dinitrotoluene to dinitrobenzoic acid comprising:
   (A) preparing a reaction mixture of dinitrotoluene, sulfuric acid and vanadium pentoxide, where the molar ratio of vanadium pentoxide to dinitrotoluene is 3 to 1;
   (B) agitating said mixture and heating to 150° C. until substantially all of the dinitrotoluene is oxidized to dinitrobenzoic acid; and
   (C) separating said dinitrobenzoic acid from the mixture.

6. A method for the preparation of phthalic acids comprising:
   (A) preparing a reaction mixture of sulfuric acid, a member of the group consisting of p-toluic acid and xylene, and vanadium pentoxide;
   (B) agitating and heating said mixture to a temperature not greater than 150° C. until the phthalic acid is formed; and
   (C) separating said phthalic acid.

References Cited

UNITED STATES PATENTS

| 1,365,956 | 1/1921 | Senderens | 260—524 |
|---|---|---|---|
| 780,404 | 1/1905 | Bazlen et al. | 260—524 |

FOREIGN PATENTS

| 22,105 | 9/1900 | Great Britain | 260—524 |

LORRAINE A. WEINBERGER, Primary Examiner

K. J. KILLOS, Assistant Examiner

UNITED STATES PATENT OFFICE
CERTIFICATE OF CORRECTION

Patent No. 3,775,473                    Dated November 27, 1973

Inventor(s) Norbert J. Mruk

It is certified that error appears in the above-identified patent and that said Letters Patent are hereby corrected as shown below:

Column 3, line 10, "(0.0360 moles)" should read --(0.0363 moles)--.

Signed and sealed this 23rd day of April 1974.

(SEAL)
Attest:

EDWARD M. FLETCHER, JR.                 C. MARSHALL DANN
Attesting Officer                        Commissioner of Patents